J. A. SEEDE.
ELECTRIC FURNACE CONTROL APPARATUS.
APPLICATION FILED APR. 12, 1916.
1,206,603.
Patented Nov. 28, 1916.
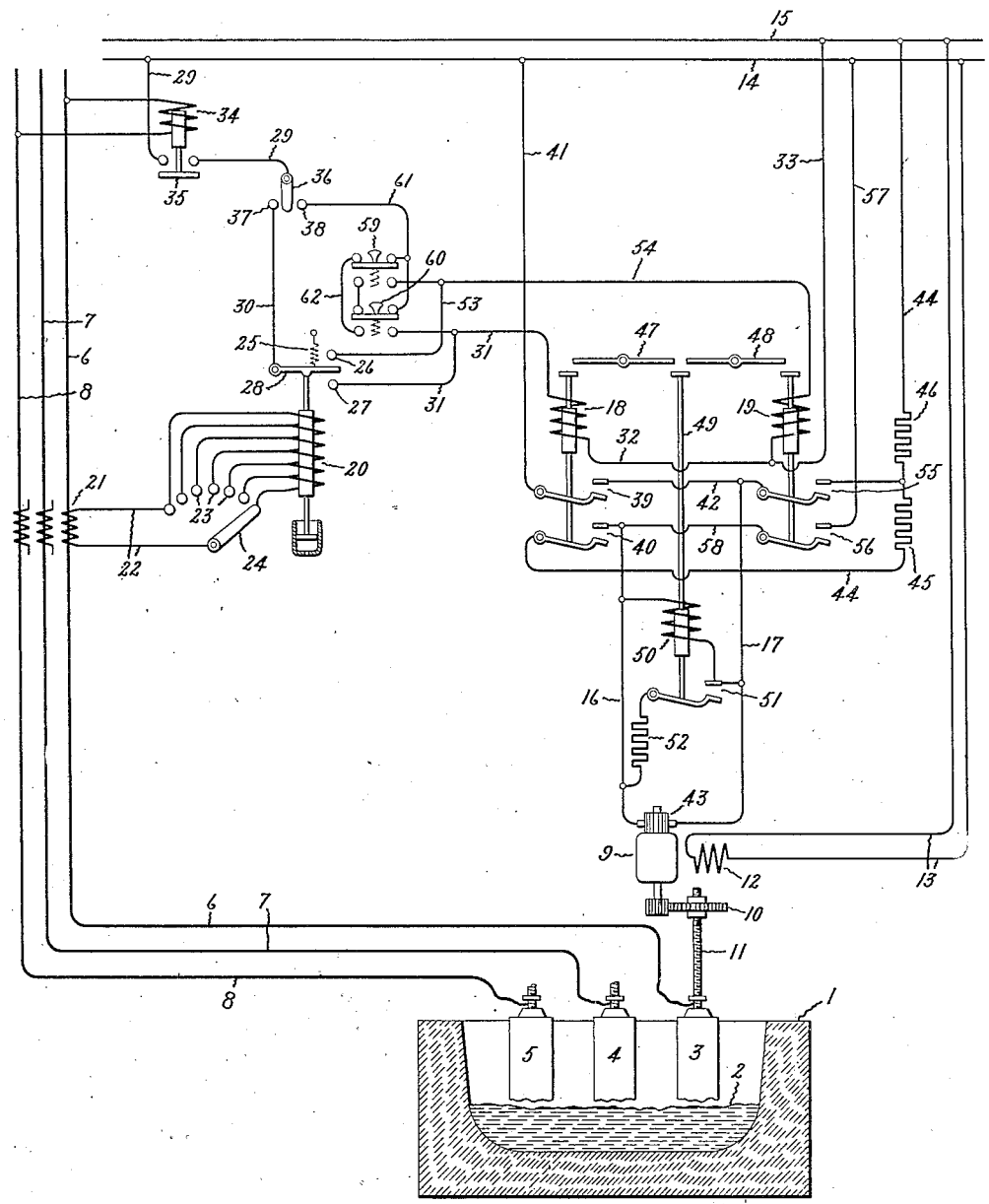
Inventor:
John A. Seede,
by
His Attorney.

UNITED STATES PATENT OFFICE.

JOHN A. SEEDE, OF SCHENECTADY, NEW YORK, ASSIGNOR TO GENERAL ELECTRIC COMPANY, A CORPORATION OF NEW YORK.

ELECTRIC-FURNACE CONTROL APPARATUS.

1,206,603.

Specification of Letters Patent.

Patented Nov. 28, 1916.

Application filed April 12, 1916. Serial No. 90,765.

*To all whom it may concern:*

Be it known that I, JOHN A. SEEDE, a citizen of the United States, residing at Schenectady, county of Schenectady, State of New York, have invented certain new and useful Improvements in Electric-Furnace Control Apparatus, of which the following is a specification.

The present invention comprises a new electric control apparatus for electric furnaces, particularly arc furnaces, and its object is to move furnace electrodes in response to a variation of current in the electrode circuit and when the desired regulation has been effected to stop the movement of the electrode promptly, without "overrunning" due to the inertia of the moving parts.

In accordance with my invention the electrodes are moved by an electric motor controlled, preferably through relays, by a circuit-closing magnet responsive to variations of power in the furnace circuit, and interlocked with a dynamic braking device, which is automatically actuated when the motor is open-circuited. I have also provided a switch for automatically disconnecting the control apparatus, thereby stopping the motor, when the voltage of the furnace supply current falls below a predetermined value. These and other features of my invention will be pointed out with greater particularity in the appended claims.

A more complete understanding of my invention may be had from the following description taken in connection with the accompanying drawing which shows diagrammatically a three-phase arc furnace provided with a control apparatus operated by direct current and constructed in accordance with my invention.

Referring to the drawing, the electric furnace is diagrammatically indicated as comprising a receptacle 1 containing a conductive charge 2 and having electrodes 3, 4 and 5 between which and the charge arcs are maintained. The electrodes are respectively connected to supply conductors 6, 7 and 8 carrying three-phase alternating current. The operating motor 9 and the accompanying control circuits have been shown in connection with electrode 3 only, but it is to be understood that the same arrangement may be used for each of the electrodes. The motor 9 is mechanically connected to the electrode by any form of suitable gearing, the drawing showing a speed-reducing gear 10, driven by the motor, acting as a nut to raise and lower the screw threaded rod 11 carrying the electrode. The motor has a continuously excited field 12, which is connected through conductors 13 to direct current supply conductors 14 and 15. The motor armature is connected by conductors 16 and 17, to the source of direct current through a control apparatus to be hereinafter more fully described for starting, stopping and reversing the motor in accordance with the variations of current in the electrode supply conductor 6.

The control apparatus includes relay magnets 18 and 19, the circuits of which are respectively closed and opened by a contact-making magnet 20. This magnet is connected to a current transformer 21, by conductors 22 and is provided with a series of taps 23 over which the switch 24 may be successively moved for adjusting the responsiveness of the magnet to any particular desired current value. The weight of the magnet is balanced by a spring 25 which may be adjusted so the magnet will tend to come at rest between contacts 26 and 27 when the current in the electrode supply circuit has a desired predetermined value. When the current is greater than this value the magnet core will be pulled down and the switch arm 28 will complete an electrical circuit through the contact 27, actuating the relay magnet 18 through conductors 29, 30, 31, 32 and 33. All of the contacts in the system have been shown as being open, it being assumed that there is no current flowing. With the system active, the magnet 34 which is connected to supply conductors 6 and 8 across one of the phases of the supply circuit will have its armature pulled up, closing the contactor 35. The switch arm 36 should be moved over to the contact 37 when it is desired to operate the control mechanism automatically. This switch 36 will be shifted to the contact 38 when it is desired to substitute hand control for automatic control. Returning to the automatic control mechanism, when the magnet 18 pulls up its armature, the switches 39, 40 are closed completing a circuit through the motor 9 through the conductor 41, the switching contact 39, conductor 42, conductor 17, armature 43, conductor 16, contact 40, and back to the opposite terminal of the direct current supply system through the conductor 44 in circuit with which are resistances 45 and 46. This will cause the motor to rotate in a direction which will raise the electrode 3 and lengthen the arc. When by the lengthening of the arc the furnace supply current has been reduced to a predetermined value the switch arm 28 will leave the contact 27 causing the relay magnet 18 to become deënergized. Both the relay magnets 18 and 19 are connected through mechanical interlocks 47, 48 and 49 to a magnet 50, which is connected to the motor supply conductors 16 and 17. As long as either the magnets 18 or 19 are closed the respective interlock 47 or 48 will prevent the magnet 50 from closing its contact 51, but as soon as these control magnets 18, 19, become deënergized the magnet 50 can raise its armature and close the contact 51. As has just been explained above, when the motor has raised the electrode 3 a desired amount, the magnet 18 is open-circuited by the switching magnet 20, and as a counter-electromotive force generated by the motor 9 is impressed on the magnet 50 the contact 51 is immediately closed, thereby short-circuiting the motor armature through the resistance 52. This has the effect of dynamically braking the motor and prevents over-running of the electrode. When the supply current becomes lower than the predetermined value, for example, by burning away of the electrode causing a lengthening of the arc, the switch arm 28 will come into contact with the contact 26 completing a circuit through the control magnet 19 through conductors 29, 30, 53, 54, and 33, closing contacts 55 and 56. The closure of these contacts will mechanically open the contact 51 in the dynamic braking circuit by means of the mechanical interlock 48, and the motor armature will be connected to the supply conductors 14 and 15 through the conductor 57, contact 56, conductors 58, 16, 17, the contact 55 and back to the conductor 15 of the supply system through the conductor 44, containing the resistance 46, thereby reversing the motor and causing it to rotate in the opposite direction to lower the electrode. When the electrode has been lowered to an amount which will cause the supply current to increase to a predetermined value, the switch blade 28 will leave the contact 26 deënergizing the relay control magnet 19 and, in the same manner as above described, will permit of the closure of the contact 51 again automatically braking the motor and preventing over-running of the same.

As already indicated, it may be desirable in some cases, for example, when the furnace is being started to operate the electrodes by hand control and for this purpose the switch 36 is moved over to the contact 38. When it is desired to lower the electrode, the push button 59 is depressed, energizing the relay control magnet 19, through the conductors 54, the switch 59 in its depressed position, the switch 60 in its raised position and the conductors 61 and 29. When it is desired to raise the electrode, the push button 60 is depressed, energizing the control magnet 18, through the conductor 31, the switch 60 in its depressed position, the conductor 62, the switch 59 in its raised position, and the conductors 61 and 29. When the voltage of the furnace supply circuit 6, 7, 8, falls below a predetermined value the relay 34 will become weakened sufficiently to open the contactor 35, thereby disconnecting the control apparatus and deënergizing the motor, while the voltage of the furnace supply is below the predetermined value.

My improved electrode control has been shown containing a controlling switch responsive to variations of current, but I wish this to be considered illustrative of a system responsive to any other electrical condition of a supply circuit for a furnace.

What I claim as new and desire to secure by Letters Patent of the United States, is,—

1. An apparatus for regulating electric furnaces, comprising an electrode to be shifted, a power circuit for said electrode, an electric motor operatively connected to said electrode, switching means responsive to variations of energy in the electrode circuit for controlling and reversing said motor, a brake resistance, and means operative to close the armature circuit of said motor through said resistance when the motor is open-circuited by said switching means.

2. An apparatus for regulating electric furnaces comprising the combination of a reversible electric motor, a supply circuit for said motor, a resistance, means for short circuiting the motor armature through said resistance to dynamically brake the motor, an electro-responsive means for changing connections to the motor to produce desired regulation, and an interlock permitting dynamic braking means to operate when the motor is deënergized.

3. A regulating apparatus for arc furnaces, comprising an electrode, an energy circuit therefor, an electric motor mechanically connected to said electrode, circuit connections for said motor, a contact-making magnet responsive to variations of energy in the electrode circuit, relay magnets energized by said contact-making magnet for changing the motor circuit connections to control the motor, and dynamic braking means interlocked with said relay magnets to brake the motor when the motor circuit is opened.

4. An apparatus for regulating furnace electrodes comprising an electrode, an energy circuit therefor, a reversible electric motor for moving said electrode, connections for energizing said motor, control means for shifting connections to reverse said motor, electro-responsive means for operating said control means in accordance with variations of current in the electrode supply circuit, a resistance, means interlocked with said control means to close the armature circuit of said motor through said resistance to brake the motor when the motor supply circuit is open, and means for disconnecting the control means, thereby deenergizing the motor, when the voltage of current in the electrode circuit falls below a predetermined value.

5. An apparatus for regulating electric furnaces comprising an electrode, an energy supply circuit therefor, an electric motor mechanically connected to said electrode, electromagnetic means, responsive to variation of energy in the electrode supply circuit, for controlling and reversing said motor, means for dynamically braking said motor, and an electromagnetic cut-out for deënergizing said motor when the voltage of the electrode supply circuit falls below a predetermined value.

6. An apparatus for regulating electric furnaces comprising the combination of an electric furnace, a furnace energy supply circuit, an electric motor mechanically connected to a member of said furnace, an energy supply circuit for the motor, means responsive to a predetermined variation of energy in the electrode supply circuit for controlling said motor, and an electromagnetic cut-out for deënergizing said control means and maintaining the same deënergized as long as the voltage in the electrode supply circuit falls below a predetermined value.

7. A regulating apparatus for electric furnaces comprising a furnace energy supply circuit, an electric furnace, an electric motor mechanically connected to a member of said furnace, means responsive to variations of energy in the supply circuit for continuously energizing said motor until a desired regulation has been effected and means for braking said motor when the desired regulation has been effected.

8. A regulating apparatus for electric furnaces comprising a furnace energy supply circuit, an electric motor for mechanically effecting the desired regulation, a separate source of energy for said motor, a control device for operating and reversing said motor, a switching magnet responsive to variations of current in the furnace supply circuit for changing the connections of said control device, and a cut-out magnet for disconnecting said control device when and as long as the voltage of the furnace supply circuit is below a predetermined value.

In witness whereof, I have hereunto set my hand this 11th day of April, 1916.

JOHN A. SEEDE.